United States Patent
Unruh et al.

(10) Patent No.: US 6,615,754 B2
(45) Date of Patent: Sep. 9, 2003

(54) VACUUM SEED PLANTER FOR TEST PLOTS AND METHOD OF USE

(75) Inventors: Stacy L. Unruh, Hutchinson, KS (US); Jack D. Hefling, Mt. Hope, KS (US); Edward A. Spexarth, Hutchinson, KS (US)

(73) Assignee: Seed Research Equipment Solutions, LLC, South Hutchinson, KS (US)

( * ) Notice: Subject to any disclaimer, the term of this patent is extended or adjusted under 35 U.S.C. 154(b) by 0 days.

(21) Appl. No.: 09/998,253

(22) Filed: Nov. 30, 2001

(65) Prior Publication Data

US 2002/0062771 A1 May 30, 2002

Related U.S. Application Data

(60) Provisional application No. 60/250,099, filed on Nov. 30, 2000.

(51) Int. Cl.[7] ................................................ A01C 7/00
(52) U.S. Cl. ........................ 111/181; 111/185; 221/211
(58) Field of Search .................................. 111/185, 181, 111/184, 174, 177, 178, 179; 221/211, 277, 278, 265, 203; 222/167, 426

(56) References Cited

U.S. PATENT DOCUMENTS

| | | | | |
|---|---|---|---|---|
| 3,796,346 A | * | 3/1974 | Ribouleau | 221/211 |
| 3,999,690 A | * | 12/1976 | Deckler | 222/367 |
| 4,449,642 A | * | 5/1984 | Dooley | 221/211 |
| 4,450,979 A | * | 5/1984 | Deckler | 221/263 |
| 4,646,939 A | * | 3/1987 | Herriau | 221/211 |
| 4,664,290 A | * | 5/1987 | Martin et al. | 221/211 |
| 4,793,511 A | * | 12/1988 | Ankum et al. | 221/211 |
| 4,898,108 A | * | 2/1990 | McDermott | 111/185 |
| 4,924,786 A | * | 5/1990 | Keeton | 111/184 |
| 5,058,766 A | * | 10/1991 | Deckler | 221/254 |
| 5,082,126 A | * | 1/1992 | Ribouleau | 221/211 |
| 5,170,909 A | * | 12/1992 | Lundie et al. | 221/211 |
| 5,325,801 A | * | 7/1994 | Fiorido | 111/185 |
| 5,535,917 A | * | 7/1996 | Ribouleau | 221/211 |
| 5,848,571 A | * | 12/1998 | Stufflebeam et al. | 111/185 |
| 6,044,779 A | * | 4/2000 | Brown et al. | 111/185 |
| 6,164,222 A | * | 12/2000 | Mayerle et al. | 111/175 |

FOREIGN PATENT DOCUMENTS

| | | | | |
|---|---|---|---|---|
| DE | 3541991 | * | 6/1987 | 111/185 |
| EP | 338883 | * | 10/1989 | 111/185 |
| SU | 1045834 | * | 10/1983 | 111/185 |
| SU | 1297747 | * | 3/1987 | 111/185 |

OTHER PUBLICATIONS

Brochure, "The Precision Vacuum Planter" by Monosem, pp. 1–11, distributed by A.T.I., Inc., Lenexa Kansas.

* cited by examiner

*Primary Examiner*—Victor Batson
(74) *Attorney, Agent, or Firm*—Bracewell & Patterson, L.L.P.

(57) ABSTRACT

A vacuum seed planter uses a single seed plate for planting multiple plots of seeds. The seed plate rotates through a seed chamber and uses vacuum pressure to pick up seeds to be planted, the seed chamber having an inlet passage for receiving seeds. A singulator dislodges excess seeds from the seed plate, and the excess seeds fall into an excess-seed compartment adjacent the seed chamber, the compartment having an outlet passage for evacuation of the excess seeds. A valve is movable between an operating position, in which the inlet passage communicates with a supply of seed and the outlet passage communicates with a vacuum source for evacuating excess seeds, and an evacuation position, in which the vacuum source is in communication with the inlet passage for evacuating the seeds in the seed chamber. Vacuum pressure on the seed plate can be maintained during evacuation of the seed chamber and excess-seed compartment.

23 Claims, 3 Drawing Sheets

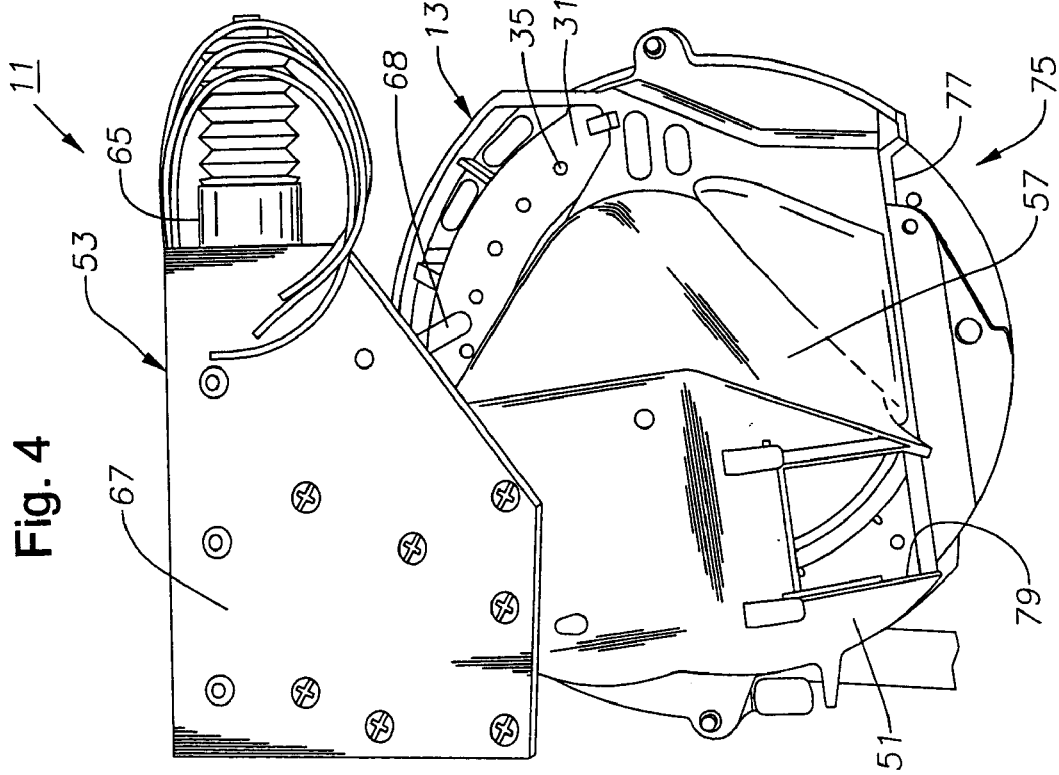
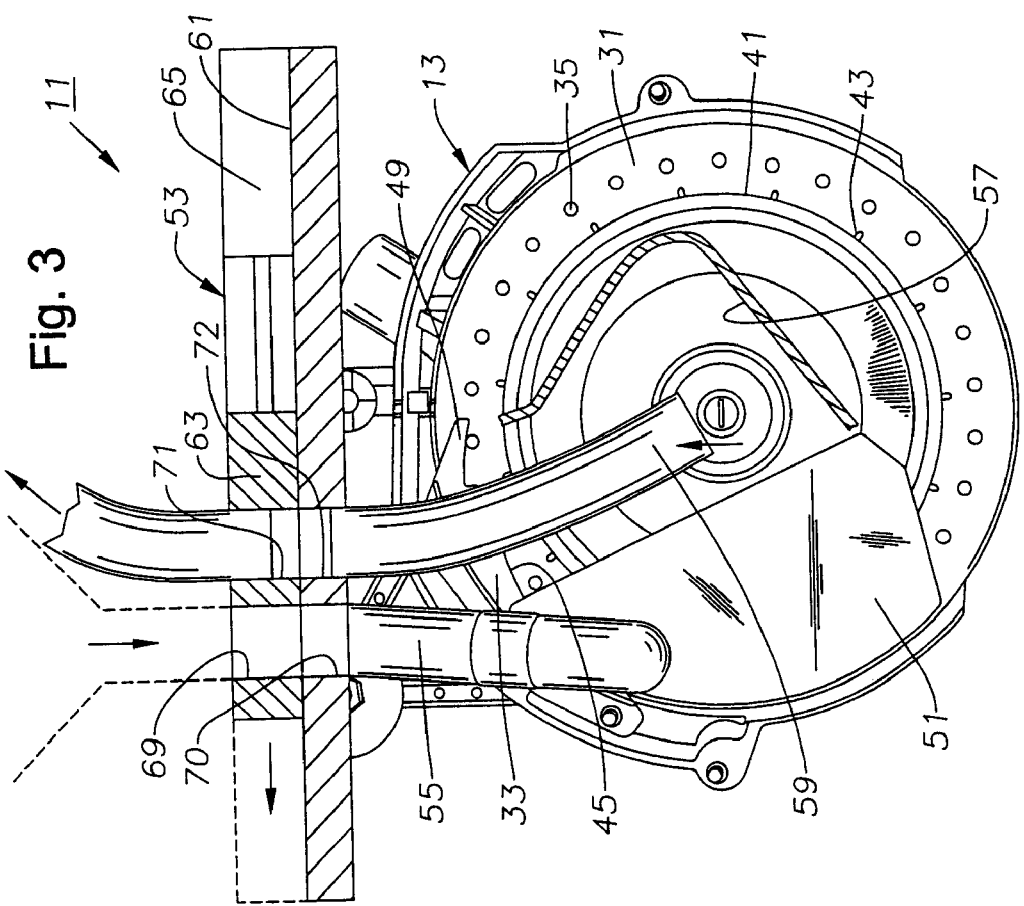

VACUUM SEED PLANTER FOR TEST PLOTS AND METHOD OF USE

CROSS REFERENCE TO RELATED APPLICATIONS

Benefit is herein claimed of the filing date under 35 USC §119 and/or §120 and CFR 1.78 to U.S. Provisional Patent Application Serial No. 60/250,099, filed on Nov. 30, 2000, entitled "Vacuum Seed Planter for Test Plots."

BACKGROUND OF THE INVENTION

1. Field of the Invention

This invention relates in general to a seed planter, and in particular to an improved vacuum seed planter for test plots.

2. Description of the Prior Art

Vacuum seed planters are used to meter the amount of seeds being planted, providing for proper spacing of seeds and reducing seed waste. The vacuum planters typically have a seed plate with radially-spaced apertures and a vacuum source for creating a vacuum pressure in the apertures. The seed plate passes through a seed chamber containing seeds to be planted, individual seeds being drawn to the apertures. A singulator device removes excess seeds, preferably leaving one seed per aperture, the excess seeds falling back within the seed chamber. When changing seed types, the seed chamber is emptied through a door near the bottom of the chamber. An example of a typical vacuum planter is the Monosem NG Plus, available from A.T.I., Inc., of Lenexa, Kans.

It is also known in the art to evacuate the seed chamber using a vacuum source. One example uses a valve for redirecting the vacuum from the seed plate to the seed chamber for evacuating the chamber. In this apparatus, the seed chamber cannot be emptied while the seed plate is in use, since the vacuum pressure is switched from the seed plate to the evacuation tube.

It is desirable to plant multiple plots of seeds, each plot having a different seed type. However, the prior art planters require that the change of seed type occur in an alleyway or require two seed plates, each having a different type of seed. In the two-seed-plate device, the first plate is used to plant a plot, then the second plate is used while the seed for the first plate is changed. The extra seed plate adds additional cost, weight, and complexity to the standard seed planter.

Therefore, there is a need for a seed planter having a single seed plate and that is capable of quickly and easily planting multiple seed plots. Also, there is a need for a seed planter that ensures that seeds can be removed from the rotating seed plate between rows or when changing seed types.

SUMMARY OF THE INVENTION

A vacuum seed planter uses a single seed plate for planting multiple plots of seeds. The seed plate rotates through a seed chamber and uses vacuum pressure to pick up seeds to be planted, the seed chamber having an inlet passage for receiving seeds. A singulator dislodges excess seeds from the seed plate, and the excess seeds fall into an excess-seed compartment adjacent the seed chamber, the compartment having an outlet passage for evacuation of the excess seeds. A valve is movable between an operating position, in which the inlet passage communicates with a supply of seed and the outlet passage communicates with a vacuum source for evacuating excess seeds, and an evacuation position, in which the vacuum source is in communication with the inlet passage for evacuating the seeds in the seed chamber. Vacuum pressure on the seed plate can be maintained during evacuation of the seed chamber and excess-seed compartment.

BRIEF DESCRIPTION OF THE DRAWINGS

The novel features believed to be characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 is a side view of the seed planter of FIG. 2 showing a seed chamber and a slide mechanism mounted thereto.

FIG. 4 is a side view of the seed planter of FIG. 3 showing a cover mounted thereto.

DETAILED DESCRIPTION OF THE INVENTION

Figure 1:
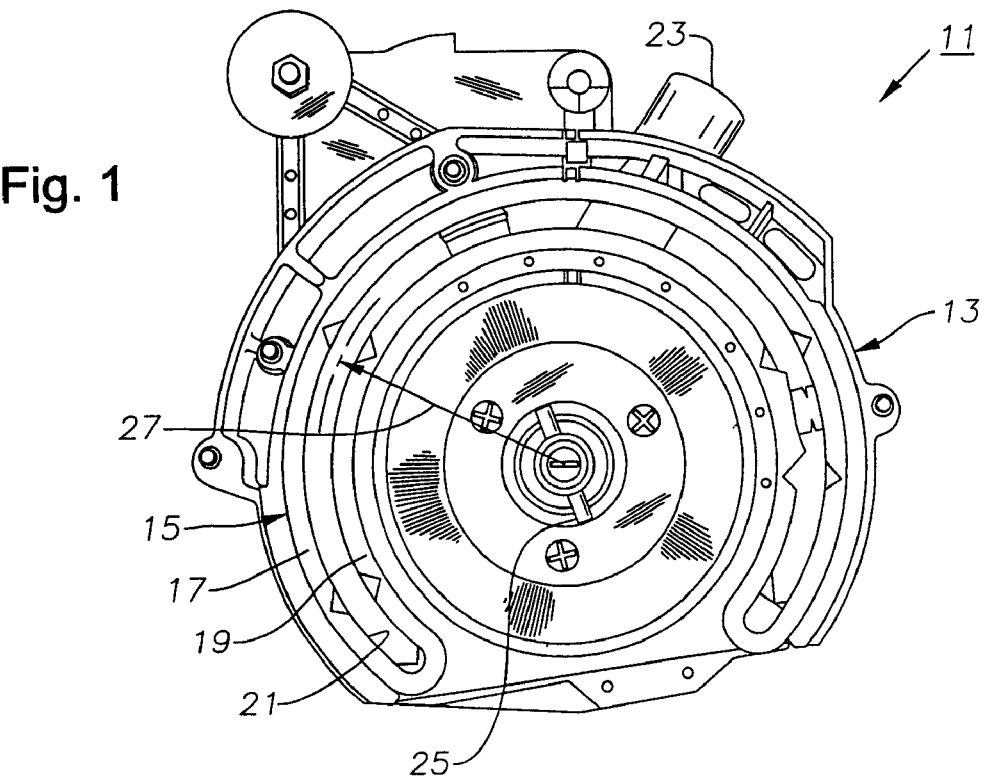
FIG. 1 is a side view of the base unit of a seed planter constructed in accordance with the present invention and shown with outer portions of the seed planter removed.
Figure 5:
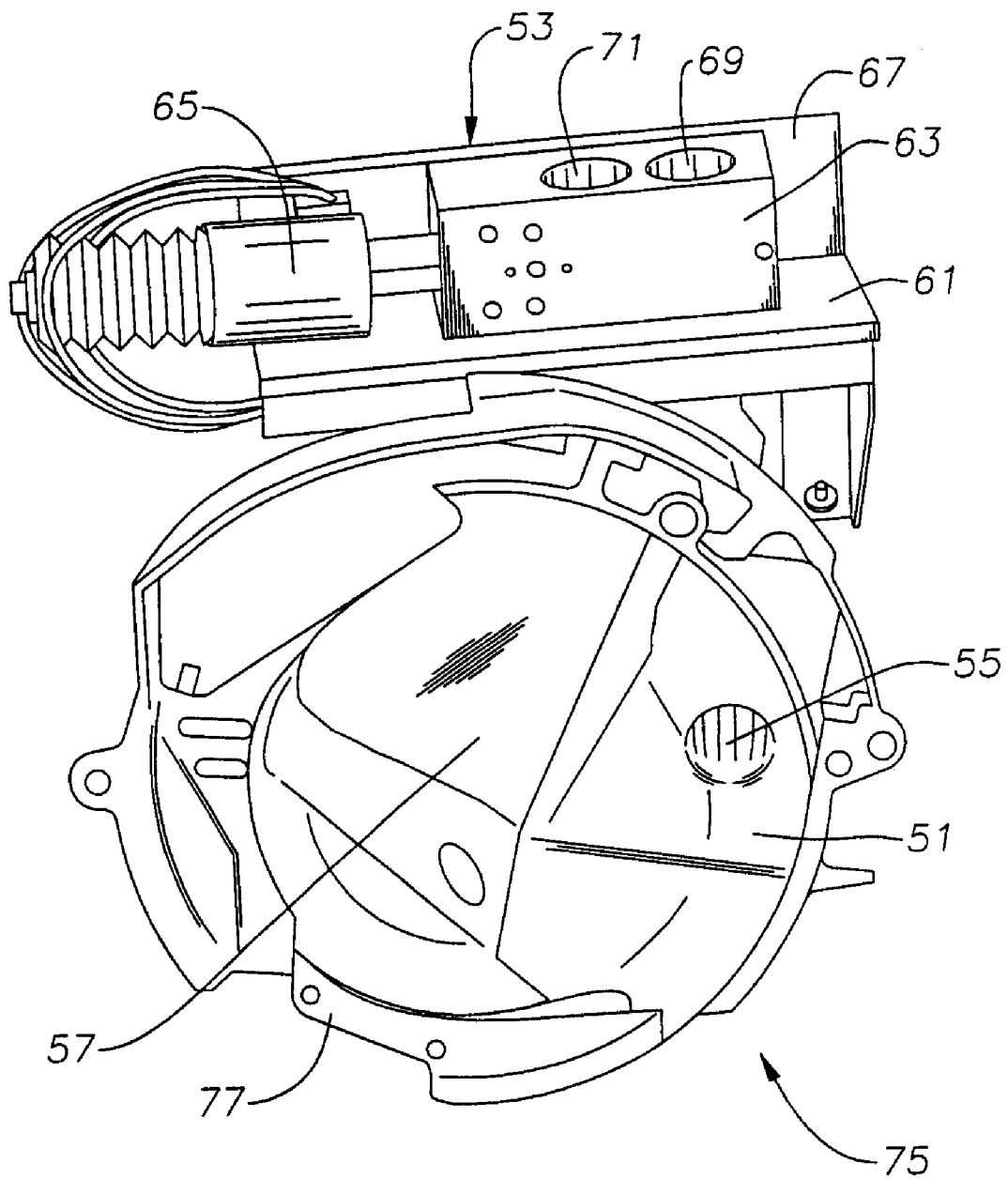
FIG. 5 is a reverse side view of the cover, seed chamber, and slide mechanism of FIGS. 3 and 4.

FIGS. 1 through 5 show a seed planter 11 constructed in accordance with the present invention. Beginning with a base unit 13 shown in FIG. 1, the various components of seed planter 11 are sequentially added through FIG. 4. FIG. 5 illustrates a reverse or opposite side view of an outer portion of seed planter 11. As shown in FIG. 1, the generally circular base unit 13 of seed planter 11 has a stationary, substantially planar UHMW plastic wear ring 15 having a pair of flat, arcuate-shaped surfaces 17, 19. An annular slot or plenum 21 is located between surfaces 17, 19 for drawing a vacuum therethrough from a tube 23 located on a backside of base unit 13. Wear ring 15 and, thus, surfaces 17, 19 and plenum 21, extend in a circular path about a rotatable drive member 25 for approximately 280 degrees (e.g., from about a "7:30" position, to a "4:30" position). As measured from the center of drive member 25 to a center of plenum 21, plenum 21 has a uniform radius 27. Drive member 25 may be driven by the planter transmission, a hydraulic drive, or other means.

Figure 2:
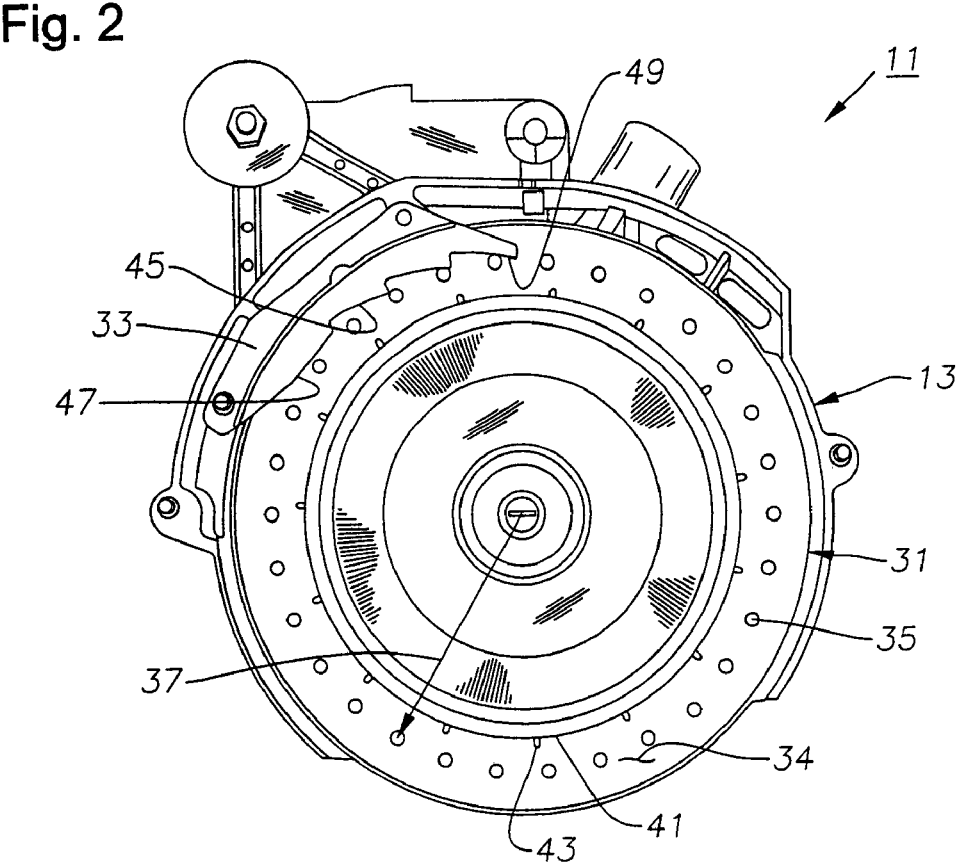
FIG. 2 is a side view of the seed planter of FIG. 1 showing a seed plate and a singulation device mounted to the base unit.

Referring now to FIG. 2, a seed plate 31 and a singulation device 33 are shown mounted to base unit 13 of seed planter 11. Seed plate 31 is preferably formed from stainless steel, and is rotatably mounted to drive member 25 relative to stationary base unit 13 and wear ring 15. Seed plate 31 has an outer surface 34 and a plurality of symmetrically spaced-apart through holes 35. Seed plate 31 is mounted against wear ring 15 (FIG. 1) such that seed plate 31's backside surface (not shown) lies substantially flush against surfaces 17, 19. The center of each hole 35 is spaced apart from the center of seed plate 31 by a uniform radius 37 that is essentially equal to radius 27 of plenum 21 so that a consistent vacuum is drawn through each hole 35. Seed plate 31 maybe provided with a greater or lesser number of holes 35 with a larger or smaller diameter depending on a variety of factors, including the size of the seeds to be planted. Seed plate 31 also has a smaller diameter intermediate plate 41 that is concentrically bolted to the center thereof for rotation therewith. Intermediate plate 41 is preferably formed from brass, and has a plurality of small, symmetrically spaced-apart agitators 43 that extend radially outward therefrom. Agitators 43 stir the seeds and facilitate greater accuracy in seed planter 11.

Singulation device 33 is stationarily mounted to base unit 13 of seed planter 11 and, thus, does not rotate with seed plate 31. Singulation device 33 is provided with a substantially planar row of progressive teeth 45 that are located adjacent to outer surface 34 of seed plate 31 in an essentially parallel configuration. The smallest tooth 47 on the lower left of singulation device 33 extends immediately adjacent to holes 35 as they rotate, while the largest tooth 49 on the upper right is designed to cover one-half to three-fourths of the surface area of holes 35. If more than one seed is drawn to a single hole 35, teeth 45 of singulation device 33 progressively "knock off" the extra seeds until one is left on each hole 35. In addition, the singulation device 33 may be adjusted to be more or less aggressive in knocking off the extra seeds.

In FIG. 3, a seed chamber 51 and a schematic view of a slide mechanism 53 have been added to the sub-assembly of seed planter 11 depicted in FIG. 2. Seed chamber 51 mounts to base unit 13 adjacent to and outside of singulation device 33. Seed chamber 51 has an interior reservoir (not shown) for holding and queuing seeds dropped down through an inlet tube 55 that extends from a hopper (not shown). Seed plate 31 rotates through the reservoir such that one or more seeds are drawn to each hole 35 and lifted toward singulation device 33. Teeth 45 then reduce the seed count per hole 35 to one. When the extra seeds are knocked off holes 35, they fall down into a compartment 57 (shown in section) that is separate from the reservoir in seed chamber 51. The extra or "rejected" seeds in compartment 57 are evacuated through an outlet tube 59 that extends upward to another hopper (not shown).

Slide mechanism 53 is shown in schematic in FIG. 3 for ease of understanding, and more realistically in FIGS. 4 and 5. Slide mechanism 53 is provided for selectively controlling the flow of seeds through inlet tube 55 and outlet tube 59. Slide mechanism 53 comprises a base 61, preferably formed from nylon, a block 63 that is slidably moved on base 61 by a solenoid 65 or air cylinder with a linear bearing, and an outer protective plate 67 (FIGS. 4 and 5). As shown in FIG. 4, a small alley wiper 68 is also located adjacent to seed plate 31 at approximately the "12:00" position (rotationally beyond singulation device 33). Alley wiper 68 may be powered by any suitable device (not shown), such as an electric solenoid or air cylinder. After one plot of planting is complete, alley wiper 68 is deployed to wipe off any remaining seed on seed plate 31 to make sure that no seeds are carried over to the next plot, and to insure that no seeds are planted in the alleyway therebetween. When a particular plot is being planted, alley wiper 68 is retracted out of the way so seed can be planted.

Referring now to FIGS. 3 and 5, block 63 has a pair of vertical through holes 69, 71 that simultaneously axially align with tubes 55, 59, and holes 70, 72 in base 61, respectively, during normal operation. Thus, seed typically falls through hole 69 and inlet tube 55 on its way to seed chamber 51, and the extra seed knocked off by singulation device 33 and/or alley wiper 68 is evacuated through outlet tube 59 and hole 71. However, when solenoid 65 is actuated, block 63 is moved away therefrom (to the left in FIG. 3, and to the right in FIG. 5) such that hole 71 is axially aligned with inlet tube 55. In this alternate position, seed chamber 51 is evacuated, and the lower end of hole 69 and outlet tube 59 are blocked. While seed chamber 51 is being evacuated, new seed can be released into hole 69. Since the lower end of hole 69 is sealed by base 61, the new seed stages there until block 63 returns to its starting position. At that time the new seed falls through hole 70 in base 61 and into seed chamber 51. FIGS. 4 and 5 also illustrate an outer protective cover 75 for seed planter 11. Cover 75 has an opening 77 near its lower end, and an optional trap door located opposite opening 77. Optimal trap door is blocked by seed chamber 51.

In operation, seed planter 11 is used to plant one seed at a time at very accurate intervals. Seeds are dispensed from a hopper through inlet tube 55 into the reservoir in seed chamber 51. As seed plate 31 rotates and a vacuum is drawn through plenum 21 and holes 35, one or more seeds are attracted to each hole 35 at about the "7:30" rotational position. Agitators 43 on intermediate plate 41 stir the seeds and facilitate greater accuracy in seed planter 11. The seeds on holes 35 are rotated toward singulation device 33 where they are progressively reduced to a single seed per hole 35 by teeth 45. From the "12:00" position clockwise to the "4:30" position a single seed is drawn to each hole 35 and remains there since alley wiper 68 (FIG. 4) is retracted in normal operation. At approximately the 4:30 position, plenum 21 ends (FIG. 1) and the seeds sequentially drop off of plate 31 and through opening 77 to the ground where they are planted at a desired rate. The extra seeds fall into compartment 57 where they are evacuated through outlet tube 59.

After the plot of planting is complete, alley wiper 68 is deployed to wipe off any remaining seed on seed plate 31 to make sure that no seeds are carried over to the next plot, and to insure that no seeds are planted in the alleyway therebetween. Solenoid 65 is actuated to move block 63 and hole 71 and evacuate the reservoir in seed chamber 51, at which time new seed is released into hole 69. When block 63 returns to its original position, the new seed falls into seed chamber 51.

Alternatively, multiple, sequential plots of seeds can be planted without deploying alley wiper 68 to remove from seed plate 31 the remaining seed from the initial plot. At a desired location, solenoid 65 is actuated to move block 63, the reservoir in seed chamber 51 being evacuated while the captured seeds from the initial plot rotate with seed plate 31. A sufficient time is allowed for evacuation of seed chamber 51, then block 63 is returned to its original position, allowing seed for the subsequent plot to fall into seed chamber 51. These new seeds are drawn to holes 35 on seed plate 31 at positions rotationally rearward from the seeds of the initial plot. Typically, the subsequent-plot seeds are separated from the initial-plot seeds by several vacant holes 35 on seed plate 31, the number of vacant holes being determined by the length of time before new seed is released into seed chamber 51 and the rate of rotation of seed plate 31. As seed plate 31 rotates, the seeds of the initial plot reach the position of the end of plenum 21 and drop, then seeds from the subsequent plot reach the end of plenum 21 and drop. This process may take approximately 1.5 seconds, and may be repeated for multiple subsequent plots, allowing a large number of plots per row.

Several advantages are realized from using the present invention. Multiple plots of seeds can be planted with a single seed plate and can be planted quickly without requiring that the change of seed type occur in an alleyway. Seeds can be changed while the original group of seeds is still being planted, reducing the total time for planting. Also, the seed planter of the invention ensures that seeds can be removed from the rotating seed plate when desired by using the alley wiper.

While the invention has been shown or described in only some of its forms, it should be apparent to those skilled in the art that it is not so limited, but is susceptible to various changes without departing from the scope of the invention.

We claim:

1. A seed planter, comprising:
   a seed chamber having an inlet passage for receiving seeds to be planted;
   a rotating seed plate that cooperates with the seed chamber to pick up and transport individual seeds from the seed chamber to a release point, where the seeds fall to the earth;
   a singulator that monitors seeds picked up by the seed plate and rejects excess seeds, dislodging the excess seeds from the seed plate;
   an excess-seed compartment for collecting the excess seeds rejected by the singulator;
   an outlet passage in the excess-seed compartment; and
   a valve comprising a first hole and a second hole, the first hole adapted to communicate with a supply of seed, the second hole adapted to communicate with the vacuum source, the valve being movable between an operating position, in which the first hole is aligned with the inlet passage and the second hole is aligned with the outlet passage, and an evacuating position, in which the first hole and the outlet passage are blocked and the second hole is aligned with the inlet hole for evacuating seeds from the seed chamber.

2. The seed planter of claim 1, wherein:
   the valve is a sliding block, and the first and second holes extend through the block.

3. The seed planter of claim 1, wherein:
   the valve moves linearly.

4. The seed planter of claim 1, wherein:
   the valve is moved by a solenoid.

5. The seed planter of claim 1, wherein:
   the valve is moved by an air cylinder.

6. A vacuum seed planter, comprising:
   a seed chamber having an inlet passage for receiving seeds to be planted;
   a rotatable seed plate that rotates through the seed chamber to pick up and transport a single-file row of seeds from the seed chamber to a release point, where the seeds fall one-by-one to the earth;
   a singulator mounted adjacent the seed plate that dislodges excess seeds from the row on the seed plate;
   an excess-seed compartment stationarily mounted below the singulator for collecting the excess seeds dislodged by the singulator, the seed compartment having an outlet;
   a vacuum tube extending to the outlet; and
   a valve comprising a first hole and a second hole, the first hole adapted to communicate with a supply of seed, the second hole adapted to communicate with a vacuum source, the valve being movable between an operating position, in which the first hole is aligned with the inlet passage of the seed chamber for receiving seeds and the second hole is aligned with the vacuum tube for evacuating the excess seeds from the excess-seed compartment, and an evacuating position, in which the first hole and the vacuum tube are blocked and the second hole is aligned with the inlet hole for evacuating seeds from the seed chamber.

7. The seed planter of claim 6, wherein:
   the valve is a sliding block, and the first and second holes extend through the block.

8. The seed planter of claim 6, wherein:
   the valve is moved by a solenoid.

9. The seed planter of claim 6, wherein:
   the valve moves linearly.

10. The seed planter of claim 6, further comprising:
    a selectively-deployable alley wiper mounted adjacent the seed plate, the alley wiper dislodging all seeds in the row when deployed.

11. A method of planting seeds, the method comprising:
    (a) picking up seeds and positioning the seeds in a single-file, circular row with a seed plate by rotating the seed plate through a seed chamber containing seeds;
    (b) dislodging excess seeds from the row;
    (c) collecting the excess seeds in an excess-seed compartment;
    (d) evacuating the excess-seed compartment using a vacuum source; and
    (e) releasing the seeds from the row on the seed plate, the seeds falling one-by-one to the earth.

12. The method of claim 11, further comprising:
    (e) moving a valve to redirect the vacuum from the excess-seed compartment to the seed chamber for evacuating the seeds in the seed chamber.

13. The method of claim 11, further comprising:
    (e) removing all seeds from the row on the seed plate by deploying an alley wiper to dislodge the seeds.

14. A seed planter, comprising:
    a seed chamber having an inlet passage for receiving seeds to be planted;
    a rotating seed plate that cooperates with the seed chamber to pick up and transport individual seeds from the seed chamber to a release point, where the seeds fall to the a singulator that monitors seeds picked up by the seed plate and rejects excess seeds, dislodging the excess seeds from the seed plate; and
    an excess-seed compartment located adjacent the seed chamber and under the singulator for collecting the excess seeds rejected by the singulator, the singulator being oriented relative to the seed chamber such that all excess seeds dislodged by the singulator fall into the excess seed compartment, bypassing the seed chamber.

15. The seed planter of claim 14, further comprising:
    a selectively-deployable alley wiper mounted adjacent the seed plate, the alley wiper being pivotal from a storage position to a deployed position while the singulator remains stationary for dislodging all seeds from the seed plate for collection in the excess-seed compartment.

16. A seed planter, comprising:
    a seed chamber having an upward-extending inlet tube for receiving seeds to be planted;
    a rotatable seed plate having a circular row of apertures that rotates through the seed chamber, the apertures communicating with a vacuum source to pick up and transport seeds from the seed chamber to a release point for dropping one-by-one onto the earth;
    a singulator mounted adjacent the row on the seed plate that dislodges excess seeds from the row on the seed plate;
    an excess-seed compartment mounted below the singulator and having an upper opening for collecting the excess seeds dislodged by the singulator;

a vacuum tube extending through the upper opening into the chamber for evacuating the excess seeds from the excess-seed chamber;

a stationary valve plate mounted above the seed chamber and the excess seed compartment, the plate having a first port into which the inlet tube of the seed chamber extends, the plate having a second port into which the vacuum tube from the excess-seed chamber extends; and a block comprising a first hole and a second hole, the holes extending through the block, the first hole adapted to communicate with a supply of seed, the second hole adapted to communicate with the vacuum source, the block being located on top of the valve plate and slidable between an operating position, in which the first hole is aligned with the first port and the second hole is aligned with the second port, and an evacuating position, in which the first hole and the second port are blocked and the second hole is aligned with the first port for evacuating the seed chamber.

17. The seed planter of claim 16, further comprising:

a selectively-deployable alley wiper mounted adjacent the seed plate, the alley wiper dislodging all seeds in the row when deployed.

18. A method of planting a plurality of seed plots, the method comprising:

(a) inserting a plurality of first-type seeds into a seed chamber for planting in a first plot; then (b) picking up the first-type seeds in the seed chamber with a seed plate by rotating the seed plate through the seed chamber for positioning the seeds in a single-file, circular row;

(c) dislodging excess first-type seeds from the row;

(d) collecting the excess first-type seeds in an excess-seed compartment;

(e) evacuating the first-type seeds from the excess-seed compartment with a vacuum tube;

(f) releasing the first-type seeds from the row on the seed plate, the first-type seeds falling one-by-one to the earth;

(g) moving a valve to shift the vacuum tube from communicating with the excess-seed compartment to communicating with the seed chamber and evacuating the first-type seeds in the seed chamber; and then (h) while continuing to rotate the seed plate, which still has first-type seeds thereon, inserting a plurality of second-type seeds into the seed chamber for planting in a subsequent plot and repeating steps (b) through (g) for each subsequent plot.

19. The method of claim 18, wherein:

first-type seeds for the initial plot and second-type seeds for the subsequent plot are simultaneously located in the row of the seed plate in step (h), the first-type seeds for the initial plot being rotationally forward of the second-type seeds for the subsequent plot.

20. A method of planting a plurality of seed plots, the method comprising:

(a) inserting a plurality of first-type seeds into a seed chamber for planting in a first plot; then (b) picking up the first-type seeds in the seed chamber with a seed plate by rotating the seed plate through the seed chamber and positioning the first-type seeds in a single-file, circular row on the seed plate;

(c) releasing the first-type seeds from the row on the seed plate, the first-type seeds falling one-by-one to the earth; then (d) removing the first-type seeds that are remaining in the seed chamber while some of the first-type seeds are still on the seed plate; then (e) while continuing to rotate the seed plate, which still has some of the first-type seeds thereon, inserting a plurality of second-type seeds into the seed chamber for planting in a subsequent plot;

(g) picking up the second-type seeds in the seed chamber with the seed plate as the seed plate continues to rotate through the seed chamber and positioning the second-type seeds in the same single-file circular row rotationally rearward of the first-type seeds still contained on the seed plate; and (h) continuing to release the second-type seeds from the row on the seed plate and dropping them one-by-one to the earth until all have been released, then without stopping rotation of the seed plate, releasing the second-type seeds from the seed plate, which fall one-by-one to the earth.

21. The method of claim 20, wherein step (b) comprises providing the seed plate with a row of apertures that are exposed to a vacuum on one side of the seed plate to cause the first-type seeds to adhere to the seed plate at the apertures.

22. A seed planter, comprising:

a seed chamber having an inlet passage for receiving seeds to be planted;

a rotating seed plate that cooperates with the seed chamber to pick up and transport individual seeds from the seed chamber to a release point, where the seeds fall to the earth;

a singulator that monitors seeds picked up by the seed plate and rejects excess seeds, dislodging the excess seeds from the seed plate;

an excess-seed compartment for collecting the excess seeds rejected by the singulator; and a vacuum tube extending to the excess-seed compartment and adapted to be connected to a vacuum source for removing the excess seeds from the excess seed compartment.

23. A seed planter, comprising:

a seed chamber for receiving a plurality of first-type seeds;

a seed plate having a plurality of apertures in a circular row, the seed plate being rotated through the seed chamber;

a vacuum plenum on one side of the seed plate to cause the first-type seeds to adhere to the apertures as the seed plate rotates through the seed chamber, the plenum terminating at a selected point to block the apertures from vacuum at a selected point to release the first-type seeds from the row on the seed plate to fall one-by-one to the earth; and means for removing the first-type seeds that are remaining in the seed chamber while some of the first-type seeds are still on the seed plate and for inserting a plurality of second-type seeds in the seed chamber while continuing to rotate the seed plate while the seed plate still has some of the first-type seeds thereon, to enable second-type seeds to be planted following the planting of the first-type seeds without ceasing rotation of the seed plate.

* * * * *